United States Patent Office 3,551,812
Patented Dec. 29, 1970

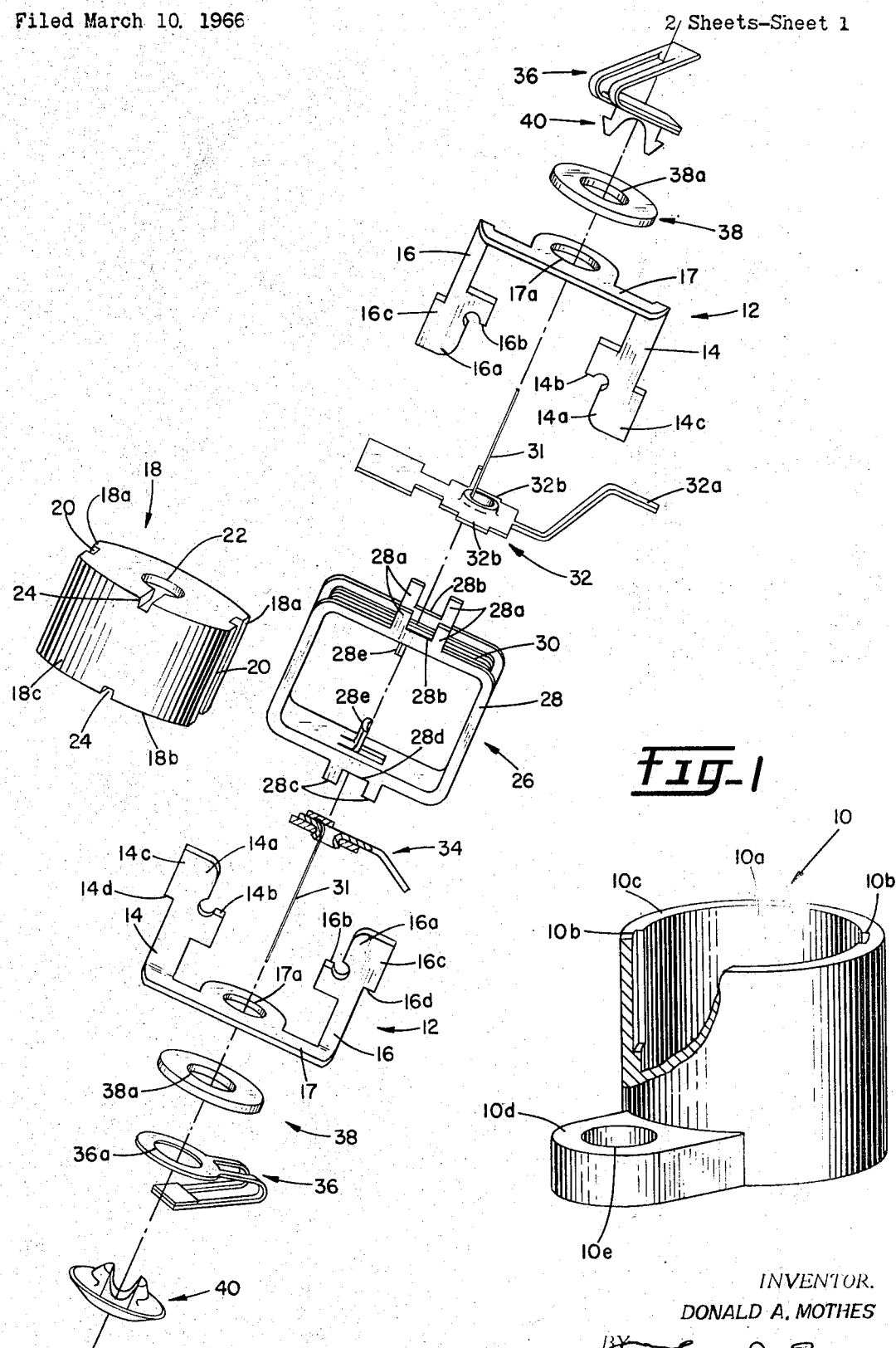

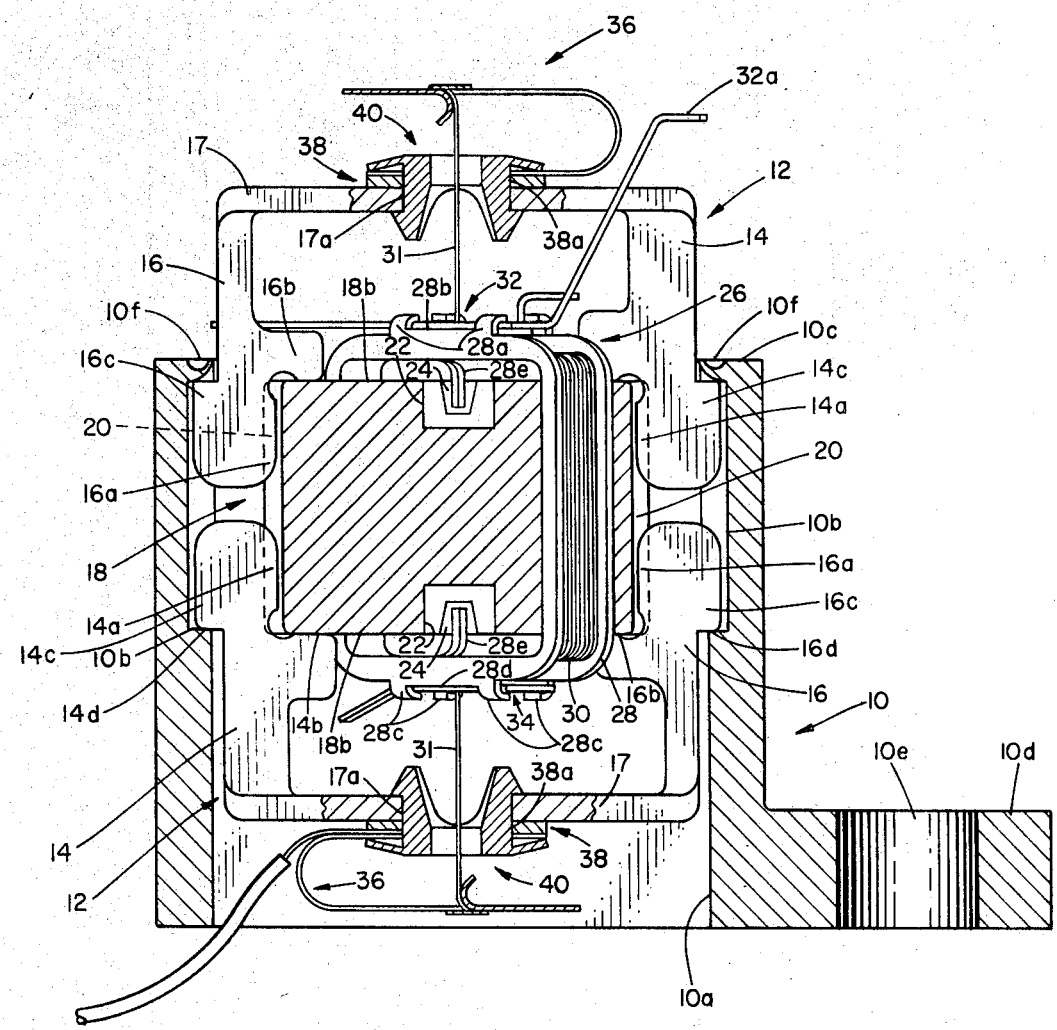
Fig_2

3,551,812
ELECTRICAL MEASURING MOVING COIL MECHANISM
Donald A. Mothes, Manchester, N.H., assignor, by mesne assignments, to Jewell Electrical Instruments, Inc., Manchester, N.H., a corporation of Delaware
Filed Mar. 10, 1966, Ser. No. 533,139
Int. Cl. G01r 1/04
U.S. Cl. 324—151                                    5 Claims

ABSTRACT OF THE DISCLOSURE

In an assembly arrangement for an electrical measuring moving coil mechanism having a core member which is accurately located by and with respect to a pair of frame members; the frame members in turn being accurately located by and with respect to a yoke member.

---

The present invention is directed to a compact and inexpensive assembly of the elements of an electrical measuring moving coil mechanism wherein the elements are located accurately with respect to each other and wherein the elements are kept to a minimum because conventional fasteners are not required to secure and maintain the elements together.

As disclosed in the preferred embodiment, the foregoing attributes are provided in a moving coil mechanism by means of elements which are arranged to be supported one from the other through the expedient of interfitting portions. The moving coil mechanism essentially comprises a yoke member, a pair of frame members, a core member, and a coil member. The core member is supported by the frame members which straddle, engage, and locate the core member therebetween by means of interfitting portions in the form of tongue and groove connections. The end portions of the frame members, which extend beyond the end surfaces of the core member, support the coil member which is disposed about the core member for rotative oscillatory movement. The subassembly of the frame members, the core member, and the coil member is in turn supported in the yoke member by means of interfitting portions in the form of tongue and groove connections. The interfitting portions allow not only for the accurate location of the elements of the moving coil mechanism with respect to each other but also eliminate the need for conventional fasteners to secure the elements together.

It is, therefore, an object of the present invention to provide an inexpensive and compact assembly of the elements of an electrical measuring moving coil mechanism which are accurately located with respect to each other and do not require conventional fasteners to maintain them together.

These and other objects will become apparent from a reading of the following specification and the appended claims taken in conjunction with the drawing wherein:

FIG. 1 is a perspective explosion view of the elements incorporating the invention; and FIG. 2 is a partial cross-sectional assembly on an enlarged scale of the elements of FIG. 1.

Referring to FIGS. 1 and 2, an electrical measuring moving coil mechanism of the taut band suspension type is shown.

An outer housing or yoke member 10 which is formed of ferrous metal and tubular in form includes a cylindrical opening 10a having a pair of oppositely disposed shouldered grooves 10b extending inwardly from upper surface 10c of the yoke member. An integral mounting lug 10d including an opening 10e extends outwardly from the bottom portion of the yoke member 10.

A pair of generally U-shaped frame members 12 which are identical each include leg portions 14 and 16 and a connecting portion 17 having an opening therethrough 17a. It will be noted that the connecting portions 17 are generally disposed in a plane at 90° from the plane of the leg portions 14 and 16.

A magnet core member 18 of substantially elliptical cross section includes a pair of parallel flattened end surfaces 18a each with a groove 20 extending the height of the core member. The core member 18 also includes counterbores 22, one of which is shown, at each end surface 18b and grooves 24 connecting the counterbores with a side surface 18c of the core member.

Coil 26 includes a tubular frame 28 having a coil winding 30 disposed thereon in conventional fashion. A taut band support with taut bands 31 fastened thereto in a manner disclosed in the Richard S. Mueller Pat. No. 3,387,807, is arranged to be disposed at the top and the bottom of the coil frame 28. The upper taut band support 32 has a cruciform mid-portion and includes a pointer portion 32a. Lateral arms 32b of the cruciform portion are arranged to be disposed between tabs 28a of the coil frame 28 and to engage rails 28b of the coil frame. With the upper taut band support 32 in place and upon tabs 28a being bent over and engaging the upper taut band support, an assembly of the coil 26 and the upper taut band support 32 arises. In a similar manner lower taut band support 34 which also has a cruciform mid-portion is arranged to be disposed between tabs 28c and to engage rails 28d of the coil frame 28 and to be assembled thereto by bending tabs 28c as set forth above.

Beryllium copper taut band anchors 36 and spacers 38 include openings 36a and 38a, respectively, which along with openings 17a of the frame members 12 accommodate resilient grommets 40 so as to allow a snap fastening of the grommets to the frame members and to thereby provide an assembly of the forementioned elements.

The frame members 12 with the taut band anchors 36, washers 38, and grommets 40 in place, core member 18, coil 26 with the upper and lower taut band supports 32 and 34 in place, are so constructed as to provide a subassembly without the need of conventional fasteners. Thus coil 26 is arranged to be disposed about the core member 18 with inwardly extending portions 28e initially passing through grooves 24 and ultimately being disposed in counterbores 22 of the core member. The inwardly extending portions 28e and the counterbores 22 cooperate in a completed subassembly to limit movement of the coil 26 transverse to the axis of the taut bands 31 as is more fully disclosed in the William L. McLenahan application, Ser. No. 533,715, filed Mar. 11, 1966. With the coil 26 about the core member 18, frame members 12 are accurately located with respect to and are joined to the core member 18 so that inner leg portions 14a and 16a enter grooves 20 of the core member until shoulder portions 14b and 16b are encountered by the end surfaces 18b. The widths of inner leg portions 14a and 16a and of grooves 20 are such as to allow a sliding fit therebetween and are such as to provide interfitting means therebetween which can be characterized as being tongue and groove connections. The taut bands 31 may now be drawn through the openings 17a of the respective frame members 12, the opening of the respective grommet 40 and the openings 38a and 36a of the respective washers 38 and taut band anchors 36 to be fastened to the taut band anchors in a manner disclosed in the forementioned Mueller application. While the subassembly requires no further securing to maintain the elements together because the taut band suspension construction acts to provide this function, cementing of the frame members 12 to the core member 18 may be desirable so as to lessen the possibilities of relative movement therebetween which may be caused by shock and vibration and which may cause damage to the taut bands 31. The same function could be accomplished by providing a light press fit between inner leg portions 14a and 16a of the frame members 12 and grooves 20 of the core member 18.

The subassembly in turn can be disposed in the yoke member 10 with outer leg portions 14c and 16c of the frame members 12 being accommodated in the grooves 10b of the yoke member. The widths of outer leg portions 14c and 16c and of grooves 10b are such as to allow a sliding fit therebetween and are such as to provide interfitting means therebetween which can be characterized as being tongue and groove connections. Shoulder portions 14d and 16d of the lower frame member 12 engage the bottom of grooves 10b, thereby defining the position of the subassembly with respect to the yoke member 10. In the preferred embodiment, the subassembly is maintained in position in the yoke member 10 by means of crimping the yoke member as at 10f. However, it would be possible ot eliminate the need for crimping by cementing or providing a light press fit as set forth above with respect to the frame members 12 and the core member 18.

With the arrangement of FIG. 2 and with electrical signals applied thereto, the coil 26 rotatably oscillates to position pointer 32a with respect to a dial, not shown, thereby giving an indication of the electrical signal supplied to the electrical measuring moving coil mechanism.

From the foregoing, it will be appreciated that a low cost electrical measuring moving coil mechanism has been disclosed which is compact, allows for ease of assembly, accurate location of the elements, and minimum expense because of the minimum number of elements required. Modifications are possible with respect to the present invention and therefore the scope of the invention should be determined from the following claims.

What is claimed is:

1. In an electrical measuring moving coil mechanism, the combination comprising: a tubular yoke member; a magnetic core member; a pair of substantially identical U-shaped frame members including opposite side portions which straddle, engage, locate and support said core member therebetween by means of longiutdinal extending interfitting tongue and groove connections provided in the side portions and said core member and opposite end portions extending beyond opposite end surfaces of said core; and a moving coil member disposed about said core member and between the end portions of said frame means and supported for movement thereabout by suspension means provided between said coil member and the opposite end portions; the resulting assembly of said frame members, said core member, and said coil member supported within the opening of said yoke member and located therein by interfitting means provided between said yoke member and the side portions of said frame means.

2. The combination of claim 1, wherein the interfitting means between said yoke member and said frame members are in the form of tongue and groove connections and wherein the resulting assembly is maintained in the yoke member by providing a crimp between the yoke member and the frame members.

3. In an electrical measuring moving coil mechanism, the combination of a moving coil and magnetic core assembly comprising: a core member; a pair of substantially identical U-shaped frame members including opposite side portions which straddle, engage, locate, and support said core member therebetween by means of longitudinal extending interfitting tongue and groove connections provided in the side portions and said core member and opposite end portions extending beyond opposite end surfaces of said core member; and a moving coil member disposed about said core member and between the end of portions of said frame members and supported for movement thereabout by suspension means provided between said coil member and the opposite end portions.

4. In an electrical measuring moving coil mechanism, the combination comprising: a tubular yoke member having oppositely disposed shouldered grooves in its interior surface extending inwardly from an end surface thereof; and an assembly disposed and supported within said yoke member comprising a pair of substantially identical U-shaped frame members each including a pair of leg portions each having a shoulder portion thereon and a connecting portion between said pair of leg portions; a magnetic core member located and supported between said frame members having a top surface, a bottom surface and end surfaces, each of said end surfaces having a groove therein extending the height of said core member; said pair of leg portions of each of said pair of frame members being slidably engaged within said grooves in said core member and said top and bottom surfaces of said core members being engaged with said shoulder portions on said leg portions of respective ones of said frame members; and a moving coil member disposed about said core member and between said connecting portions of said frame members and supported for movement therebetween by suspension means provided between said coil member and the opposite ones of said connecting portions; said leg portions of said frame members being slidably engaged within said oppositely disposed shouldered grooves in said yoke member to locate and support said assembly within said yoke member.

5. In an electrical measuring moving coil mechanism, the combination as claimed in claim 4, wherein said leg portions of said frame members are retained within said oppositely disposed shouldered grooves in said yoke member by providing a crimp between said yoke member and said leg portions.

References Cited

UNITED STATES PATENTS

| 3,406,339 | 10/1968 | Bibbings | 324—151 |
| 2,978,640 | 4/1961 | Arbeiter et al. | 324—151 |
| 3,141,133 | 7/1964 | Wahlstedt | 324—151 |

FOREIGN PATENTS

| 899,106 | 6/1962 | Great Britain | 324—151 |

ALFRED E. SMITH, Primary Examiner

U.S. Cl. X.R.

324—154

UNITED STATES PATENT OFFICE
CERTIFICATE OF CORRECTION

Patent No. 3,551,812              Dated December 29, 1970

Inventor(s) Donald A. Mothes

It is certified that error appears in the above-identified patent and that said Letters Patent are hereby corrected as shown below:

Column 3, lines 1 and 2, cancel "3. In an electrical measuring moving coil mechanism, the combination of a moving coil and magnetic core as-" and insert the same in column 4, after line 2.

Signed and sealed this 1st day of June 1971.

(SEAL)
Attest:

EDWARD M. FLETCHER, JR.          WILLIAM E. SCHUYLER, JR.
Attesting Officer                Commissioner of Patents